(12) United States Patent
Nomichi et al.

(10) Patent No.: US 9,831,507 B2
(45) Date of Patent: Nov. 28, 2017

(54) HYDROGEN GAS SUPPLY DEVICE OF FUEL CELL SYSTEM

(75) Inventors: Kaoru Nomichi, Ono (JP); Yutaka Suzuki, Kobe (JP); Makoto Ninomiya, Kobe (JP); Mikiya Shinohara, Yokohama (JP); Masato Odashima, Yokosuka (JP)

(73) Assignees: KAWASAKI JUKOGYO KABUSHIKI KAISHA, Kobe (JP); NISSAN MOTOR CO., LTD., Yokohama (JP)

( * ) Notice: Subject to any disclaimer, the term of this patent is extended or adjusted under 35 U.S.C. 154(b) by 678 days.

(21) Appl. No.: 13/814,010

(22) PCT Filed: Aug. 4, 2011

(86) PCT No.: PCT/JP2011/004436
§ 371 (c)(1),
(2), (4) Date: Mar. 25, 2013

(87) PCT Pub. No.: WO2012/017665
PCT Pub. Date: Feb. 9, 2012

(65) Prior Publication Data
US 2013/0183601 A1 Jul. 18, 2013

(30) Foreign Application Priority Data
Aug. 6, 2010 (JP) .................................. 2010-177857

(51) Int. Cl.
*H01M 8/04* (2016.01)
*F16K 1/00* (2006.01)
(Continued)

(52) U.S. Cl.
CPC ..... *H01M 8/04104* (2013.01); *F16K 31/0613* (2013.01); *F16K 31/0624* (2013.01);
(Continued)

(58) Field of Classification Search
CPC ............. F16K 31/0613; F16K 31/0624; F16K 31/426; F16K 17/34; F16K 17/00; F16K 17/196; F16K 17/30; F16K 27/0263; F16K 27/029; H01M 8/04201; H01M 8/04104
See application file for complete search history.

(56) References Cited

U.S. PATENT DOCUMENTS

2004/0231726 A1   11/2004   Nakajima et al.
2006/0127722 A1*   6/2006   Nakajima ............. F16K 17/196
429/444
(Continued)

FOREIGN PATENT DOCUMENTS

JP      U-06-034143      5/1994
JP      A-09-269836     10/1997
(Continued)

OTHER PUBLICATIONS

International Search Report issued in Application No. PCT/JP2011/004436; Dated Aug. 30, 2011 (With Translation).
(Continued)

*Primary Examiner* — Stephen Yanchuk
(74) *Attorney, Agent, or Firm* — Oliff PLC

(57) ABSTRACT

A hydrogen gas supply device supplies hydrogen gas to a fuel cell stack and includes an electromagnetic pressure regulating valve that regulates the pressure of the hydrogen gas to low pressure. The electromagnetic pressure regulating valve includes a housing, and a valve passage connecting a primary port and a secondary port is formed in the housing. A valve body controls an opening degree of the valve passage and is provided in the housing. A high-pressure sealing member and low-pressure sealing member are provided on an outer periphery of the valve body. The high-pressure sealing member and the low-pressure sealing member are provided in this order from one end side of the valve
(Continued)

body to the other end side thereof. The electromagnetic pressure regulating valve further includes a housing pressure equalizing passage connecting the secondary port and a buffer chamber formed between the high-pressure sealing member and the low-pressure sealing member.

14 Claims, 9 Drawing Sheets

(51) Int. Cl.
*H01M 8/04089* (2016.01)
*F16K 31/06* (2006.01)
*F16K 31/42* (2006.01)
*H01M 8/04082* (2016.01)
*G05D 16/20* (2006.01)
*F16K 17/196* (2006.01)

(52) U.S. Cl.
CPC ....... *F16K 31/426* (2013.01); *G05D 16/2013* (2013.01); *H01M 8/04201* (2013.01); *F16K 17/196* (2013.01)

(56) References Cited

U.S. PATENT DOCUMENTS

2007/0289638 A1   12/2007   Ishitoya et al.
2008/0251748 A1*  10/2008   Neff ................. F16K 27/0263
                                                                251/129.15
2009/0229692 A1*   9/2009   Rohwer ............... F16K 17/19
                                                                137/625.13
2010/0051842 A1*   3/2010   Mertens ............. F02M 25/0777
                                                                251/129.08
2010/0229954 A1*   9/2010   Kitt .................... F16K 17/30
                                                                137/10

FOREIGN PATENT DOCUMENTS

| JP | A-2002-243058 | 8/2002 |
| JP | A-2002-295709 | 10/2002 |
| JP | A-2002-295712 | 10/2002 |
| JP | A-2003-232458 | 8/2003 |
| JP | A-2004-245243 | 9/2004 |
| JP | A-2006-172123 | 6/2006 |
| JP | A-2008-288038 | 11/2008 |
| JP | A-2008-299766 | 12/2008 |
| JP | A-2009-098961 | 5/2009 |
| JP | A-2011-052750 | 3/2011 |

OTHER PUBLICATIONS

Dec. 2, 2015 extended European Search Report issued in Application No. 11814300.7.

* cited by examiner

HYDROGEN GAS SUPPLY DEVICE OF FUEL CELL SYSTEM

TECHNICAL FIELD

The present invention relates to a hydrogen gas supply device of a fuel cell system, the hydrogen gas supply device being configured to supply a hydrogen gas to a fuel cell stack.

BACKGROUND ART

PTL 1 discloses an electromagnetic pressure regulating valve capable of controlling the flow rate (or pressure) of a hydrogen gas to a fuel cell stack with a high degree of accuracy.

CITATION LIST

Patent Literature

PTL 1: Japanese Laid-Open Patent Application Publication No. 2002-295712

SUMMARY OF INVENTION

Technical Problem

The electromagnetic pressure regulating valve described in PTL 1 includes a slide sealing portion configured to airtightly separate a primary port and a pressure return chamber, and an acting force applied to a valve body and generated by pressure upstream of the electromagnetic pressure regulating valve is cancelled substantially entirely. Therefore, the electromagnetic pressure regulating valve can control the flow rate (or pressure) of the hydrogen to the fuel cell stack with a high degree of accuracy without being influenced by the pressure upstream of the electromagnetic pressure regulating valve.

Generally, a diaphragm does not have adequate pressure resistance. Therefore, in a case where a diaphragm seal method is used at the slide sealing portion, and the upstream pressure becomes high, the slide sealing portion may be damaged. Instead of the diaphragm seal method, an O ring seal method may be used. In this case, if the upstream pressure becomes high during the operation of the electromagnetic pressure regulating valve, hydrogen leakage may occur by an unintended external factor.

Here, an object of the present invention is to provide a hydrogen gas supply device including an electromagnetic pressure regulating valve capable of controlling the flow rate (or pressure) of the hydrogen to the fuel cell stack with a high degree of accuracy even if the upstream pressure is high and preventing hydrogen gas leakage to the atmosphere.

Solution to Problem

A hydrogen gas supply device of the present invention is a hydrogen gas supply device of a fuel cell system configured to supply a hydrogen gas to a fuel cell stack, the hydrogen gas supply device including: a hydrogen gas passage connecting a hydrogen tank configured to store a high-pressure hydrogen gas and a fuel cell stack configured to consume a low-pressure hydrogen gas; and a pressure regulating valve provided on the hydrogen gas passage and configured to regulate pressure of the hydrogen gas flowing out from the hydrogen tank to supply the hydrogen gas to the fuel cell stack, wherein: the pressure regulating valve includes a housing including a valve passage connecting a primary port connected to the hydrogen tank and a secondary port connected to the fuel cell stack, a valve body provided in the housing and configured to move between a closed position where the valve body closes the valve passage and an open position where the valve body opens the valve passage to control an opening degree of the valve passage, and a first sealing member and a second sealing member provided on an outer periphery of the valve body; one end side of the valve body is located on the valve passage side, and the other end side of the valve body is located in a pressure return chamber formed in the housing; the first sealing member and the second sealing member are provided in this order from the one end side of the valve body to the other end side of the valve body; and the pressure regulating valve further includes a first pressure equalizing passage connecting the secondary port and a first space formed between the first sealing member and the second sealing member.

According to the present invention, the high-pressure hydrogen gas flows from the hydrogen tank through the hydrogen gas passage to be introduced to the fuel cell stack and consumed in the fuel cell stack. The pressure regulating valve is provided on the hydrogen gas passage and regulates the pressure of the hydrogen gas. In the pressure regulating valve, the hydrogen gas of the hydrogen tank is supplied to the primary port and flows through the valve passage to be discharged through the secondary port and introduced to the fuel cell stack. At this time, the valve body controls the opening degree of the valve passage to regulate the pressure of the hydrogen gas to low pressure. With this, the hydrogen gas whose pressure has been regulated to the low pressure is introduced to the fuel cell stack.

In the pressure regulating valve configured to regulate the pressure of the hydrogen gas as above, the first sealing member is provided on the primary port side, the second sealing member is provided on the pressure return chamber side, and the first space is formed between the first sealing member and the second sealing member. Therefore, even if the high-pressure hydrogen gas on the primary port side leaks through the first sealing member by an unintended external factor during the operation of the pressure regulating valve, the high-pressure hydrogen gas flows out to the first space. Since the first space is connected to the secondary port through the pressure equalizing passage, the hydrogen gas having flowed out to the first space is returned to the secondary port through the pressure equalizing passage. To be specific, the pressure regulating valve has a safety structure by which the hydrogen gas having flowed out to the first space is discharged through the secondary port to be consumed in the fuel cell stack. Therefore, the high-pressure hydrogen gas on the primary port side can be prevented from leaking to the atmosphere.

In the above invention, it is preferable that: the pressure regulating valve include a second pressure equalizing passage connecting the secondary port and the pressure return chamber; and the valve body include a secondary side pressure receiving portion on which pressure of the secondary port acts in a direction toward the open position that is a direction in which the valve body moves toward the open position and a pressure return chamber side pressure receiving portion on which pressure of the pressure return chamber acts in a direction toward the closed position that is a direction in which the valve body moves toward the closed position.

According to the above configuration, by introducing the pressure of the secondary port, that is, the secondary pressure to the pressure return chamber through the second pressure equalizing passage, a force generated by the pressure in the secondary port and acting from one end side of the valve body and a force generated by the pressure in the pressure return chamber and acting from the other end side of the valve body can be caused to be opposed to each other.

In the above invention, it is preferable that the pressure regulating valve further include: a third sealing member provided on the outer periphery of the valve body so as to be located closer to the other end side of the valve body than the second sealing member; a second space formed between the third sealing member and the second sealing member; a bearing member accommodated in the second space; and an atmosphere communication passage connecting the second space and an atmosphere.

According to the above configuration, a lubricant can be easily supplied to the bearing member through the atmosphere communication passage. Moreover, since the lubricant is prevented from being mixed with the hydrogen gas flowing to the secondary port, the lubricant does not influence downstream devices.

In the above invention, it is preferable that a pressure receiving area of the pressure return chamber side pressure receiving portion be larger than that of the secondary side pressure receiving portion.

According to the above configuration, the pressure regulating valve is a normally closed valve since a force acts so as to push the valve body in a closed direction.

In the above invention, it is preferable that: the third sealing member be a diaphragm seal; and the diaphragm seal be provided at the other end side of the valve body, and the diaphragm seal and the other end side of the valve body constitute the pressure return chamber side pressure receiving portion.

According to the above configuration, by adopting the diaphragm seal as the third sealing member, sliding friction by the third sealing member can be eliminated, and a force acting on the diaphragm seal can be transmitted to the valve body.

In the above invention, it is preferable that: the valve body include a first pressure receiving surface configured to receive primary pressure, introduced to the primary port, in the direction toward the open position and a second pressure receiving surface configured to receive the primary pressure in the direction toward the closed position; and a pressure receiving area of the first pressure receiving surface be equal to that of the second pressure receiving surface.

According to the above configuration, the primary pressure received by the first pressure receiving surface of the valve body can be canceled by the pressure received by the second pressure receiving surface of the valve body. With this, the change in the secondary pressure due to the change in the primary pressure can be eliminated, and the pressure controllability of the secondary pressure can be further improved. In addition, a force for driving the valve body can be reduced, and the pressure regulating valve can be reduced in size.

In the above invention, it is preferable that: the valve body include a first pressure receiving surface configured to receive primary pressure, introduced to the primary port, in the direction toward the open position and a second pressure receiving surface configured to receive the primary pressure in the direction toward the closed position; and a pressure receiving area of the first pressure receiving surface be smaller than that of the second pressure receiving surface.

According to the above configuration, the acting force acting on the second pressure receiving surface is larger than the acting force acting on the first pressure receiving surface. Therefore, a force corresponding to the primary pressure acts on the valve body in the closed direction, and even if the primary pressure drastically changes and increases, the valve body is pushed toward the closed position. On this account, the valve passage is prevented from opening undesirably, and the valve passage can be firmly closed so as to prevent the hydrogen gas from leaking from the primary side to the secondary side.

In the above invention, it is preferable that: the pressure regulating valve include a return spring configured to bias the valve body in the direction toward the closed position and a valve body driving unit configured to apply a driving force, corresponding to an applied voltage or an applied current, to the valve body against the biasing of the return spring to cause the valve body to move in the direction toward the open position; and the pressure regulating valve be a normally closed valve configured such that when the applied voltage or the applied current applied to the valve body driving unit is stopped, the valve body moves in the direction toward the closed position by the return spring.

According to the above configuration, the valve passage can be urgently shut off by stopping applying the applied voltage or the applied current to the pressure regulating valve.

In the above invention, it is preferable that the hydrogen gas supply device further include: a pressure detector provided on the hydrogen gas passage so as to be located downstream of the pressure regulating valve and configured to detect the pressure of the hydrogen gas supplied to the fuel cell stack; and a control unit configured to control the applied voltage or the applied current, applied to the valve body driving unit, in accordance with the pressure detected by the pressure detector to regulate the secondary pressure to target pressure of the fuel cell stack.

According to the above configuration, the control unit controls the applied voltage or the applied current, applied to the valve body driving unit, in accordance with the pressure detected by the pressure detector and adjusts the pressure of the hydrogen gas, supplied to the fuel cell stack, to the target pressure. With this, the hydrogen gas of the target pressure can be supplied to the fuel cell stack regardless of the pressure loss in the hydrogen gas supply device.

In the above invention, it is preferable that when the pressure detected by the pressure detector becomes equal to or higher than predetermined specified pressure, the control unit control the applied voltage or the applied current, applied to the valve body driving unit, to cause the valve body to move toward the closed position.

According to the above configuration, the supply of the hydrogen gas to the fuel cell stack can be stopped when the pressure of the hydrogen gas of the fuel cell stack has drastically increased. With this, the pressure of the hydrogen gas in the fuel cell stack can be prevented from increasing to abnormal pressure that is equal to or higher than the specified pressure (pressure higher than normal pressure and lower than withstand pressure of the fuel cell stack).

In the above invention, it is preferable that the pressure regulating valve be an in tank type or on tank type container master valve in which the valve body driving unit is provided at a supply port of the high-pressure tank.

According to the above configuration, since the pressure regulating valve is provided at the supply port of the hydrogen tank, the pressure level output from the hydrogen tank becomes low, and the safety of system is improved.

In the above invention, it is preferable that the hydrogen gas supply device further include an electromagnetic shutoff valve provided on the hydrogen gas passage so as to be located upstream of the pressure regulating valve and configured to be able to shut off supply of the hydrogen gas to the pressure regulating valve.

According to the above configuration, two valves that are the pressure regulating valve and the electromagnetic shutoff valve each having a shutoff function are provided between the hydrogen tank and the fuel cell stack, and these two valves can shut off communication between the hydrogen tank and the fuel cell stack. With this, the safety of the system is improved.

In the above invention, it is preferable that the hydrogen gas supply device further include an electromagnetic shutoff valve provided on the hydrogen gas passage so as to be located downstream of the pressure regulating valve and configured to be able to shut off supply of the hydrogen gas to the fuel cell stack.

According to the above configuration, two valves that are the pressure regulating valve and the electromagnetic shutoff valve each having the shutoff function are provided between the hydrogen tank and the fuel cell stack, and these two valves can shut off communication between the hydrogen tank and the fuel cell stack. With this, the safety of the system is improved. Moreover, by providing the electromagnetic shutoff valve downstream of the pressure regulating valve, a low-pressure solenoid valve can be used as the electromagnetic shutoff valve. With this, the manufacturing cost of the electromagnetic shutoff valve can be made lower than a case where the electromagnetic shutoff valve is provided upstream of the pressure regulating valve.

It is desirable that the low-pressure electromagnetic shutoff valve be, for example, a direct-drive valve (a single-stage solenoid valve in which a thrust force of an electromagnetic solenoid is reduced, and the valve body does not open when the pressure of the fuel cell stack exceeds the specified pressure) which opens only when the pressure of the fuel cell stack is equal to or lower than the specified pressure and which is low in the manufacturing cost. If some kind of abnormality occurs on the pressure regulating valve during the stop of the vehicle (the fuel cell system), and the high-pressure hydrogen gas leaks to the secondary port side by an unintended external factor during the operation of the pressure regulating valve, the pressure upstream of the electromagnetic shutoff valve increases. If this upstream pressure exceeds the specified pressure of the fuel cell stack, the electromagnetic shutoff valve does not open at the time of the next start-up of the vehicle. Therefore, by adopting the direct-drive electromagnetic shutoff valve, the high-pressure hydrogen gas having higher pressure than the specified pressure can be prevented from flowing to the fuel cell stack. With this, the fuel cell stack can be protected. In addition, since the electromagnetic shutoff valve does not open, the abnormality of the pressure regulating valve can be presumed and detected without using a pressure sensor.

Advantageous Effects of Invention

The present invention can provide the hydrogen gas supply device of the fuel cell system, the hydrogen gas supply device including the pressure regulating valve capable of controlling the flow rate (or pressure) of the hydrogen to the fuel cell stack with a high degree of accuracy even if the upstream pressure is high and preventing the hydrogen gas leakage to the atmosphere.

DESCRIPTION OF EMBODIMENTS

Figure 1:
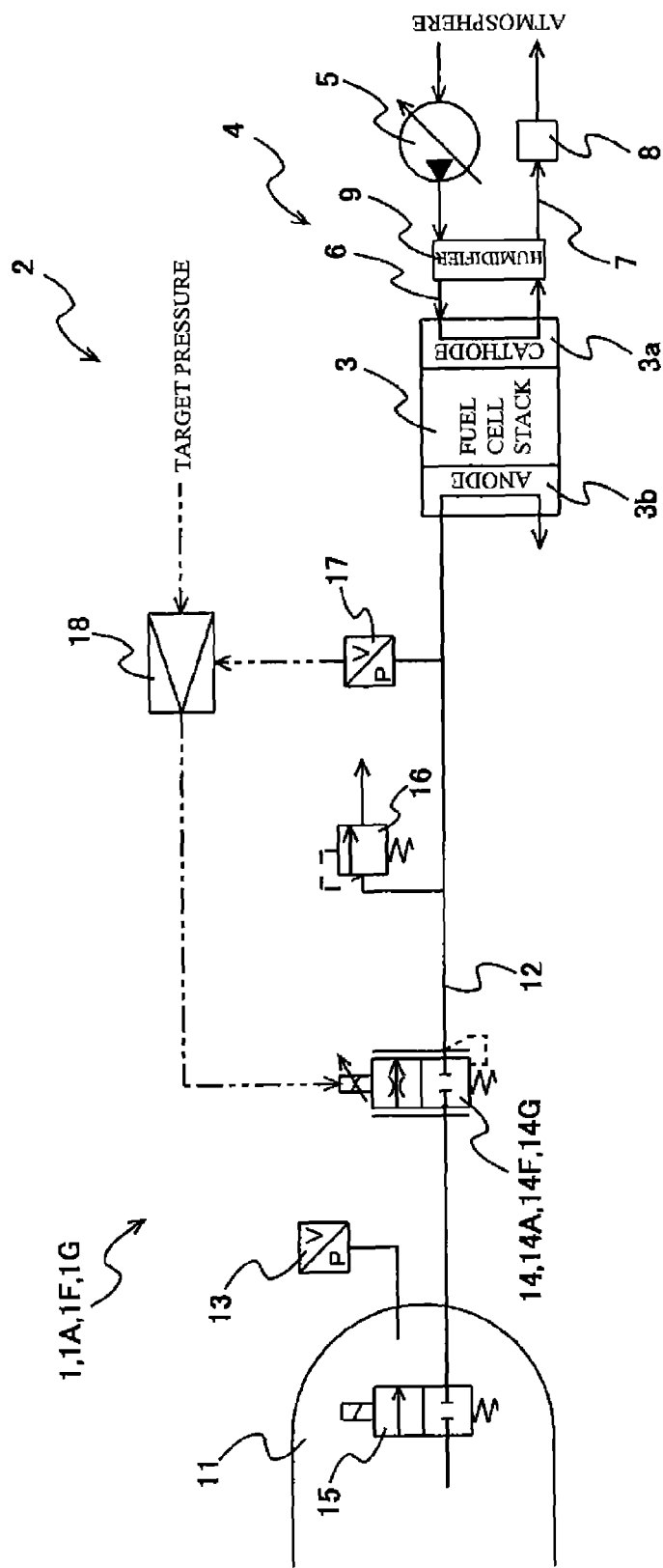
FIG. 1 is a circuit diagram showing the configuration of a fuel cell system including a hydrogen gas supply device of Embodiment 1 or 2.

Hereinafter, hydrogen gas supply devices 1 and 1A to 1G according to Embodiments 1 to 8 of the present invention and fuel cell systems 2 and 2B to 2G each including the hydrogen gas supply device will be explained in reference to the above-described drawings. Each of the hydrogen gas supply devices 1 and 1A to 1G and the fuel cell systems 2 and 2B to 2G is just one embodiment of the present invention. The present invention is not limited to these embodiments. Additions, eliminations, and modifications may be made within the spirit of the present invention.

Embodiment 1

Fuel Cell System

The fuel cell system 2 is provided in a vehicle, such as a fuel-cell vehicle and is configured to supply electric power to a driving source, such as a motor, configured to drive driving wheels of the vehicle. The fuel cell system 2 includes a fuel cell stack 3, an air supply device 4, and a hydrogen gas supply device 1. The fuel cell stack 3 includes a cathode electrode 3a and an anode electrode 3b and generates electric power by the supply of air to the cathode electrode 3a and the supply of a hydrogen gas to the anode electrode 3b. The amount of electric power generated by the fuel cell stack 3 can be adjusted by regulating supply pressure of the hydrogen gas supplied to the anode electrode 3b. The air supply device 4 is connected to the cathode electrode 3a of the fuel cell stack 3 configured as above, and the hydrogen gas supply device 1 is connected to the anode electrode 3b of the fuel cell stack 3.

Air Supply Device

The air supply device 4 is configured to supply air in the atmosphere to the cathode electrode 3a and includes a compressor 5, an air supply passage 6, an air discharge passage 7, and an air pressure regulating valve 8. The compressor 5 is connected to the cathode electrode 3a through the air supply passage 6 and is configured to pressurize the air in the atmosphere to supply the air to the cathode electrode 3a. The air discharge passage 7 is also connected to the cathode electrode 3a and is open to the atmosphere through the air pressure regulating valve 8. The air pressure regulating valve 8 has a function of regulating the supply pressure of the air in conjunction with the air compressor 5, the air being supplied to the cathode electrode 3a. A humidifier 9 is provided on the air supply passage 6 and the air discharge passage 7 and is configured to absorb moisture from the air flowing through the air discharge passage 7 and humidify the air flowing through the air supply passage 6 by the moisture obtained by the moisture absorption.

Hydrogen Gas Supply Device

The hydrogen gas supply device 1 is configured to supply the hydrogen gas to the anode electrode 3b and includes a hydrogen tank 11, a hydrogen gas passage 12, a tank pressure sensor 13, an electromagnetic pressure regulating valve 14, an electromagnetic shutoff valve 15, a safety relief valve 16, a passage pressure sensor 17, and a controller 18. The hydrogen tank 11 is a so-called high-pressure tank and can store the hydrogen gas of high pressure, such as 35 MPa or 70 MPa, and the tank pressure sensor 13 outputs a signal corresponding to internal pressure of the hydrogen tank 11. The hydrogen tank 11 is connected to the anode electrode 3b through the hydrogen gas passage 12, and the electromagnetic pressure regulating valve 14 is provided on the hydrogen gas passage 12. Although a specific configuration of the electromagnetic pressure regulating valve 14 will be described below, the electromagnetic pressure regulating valve 14 has a function of regulating the pressure of the high-pressure hydrogen gas, flowing out from the hydrogen tank 11, to low pressure to supply the hydrogen gas to the fuel cell stack 3. The electromagnetic shutoff valve 15 is provided on the hydrogen gas passage 12 so as to be located upstream of the electromagnetic pressure regulating valve 14.

The electromagnetic shutoff valve 15 has a function of opening and closing the hydrogen gas passage 12. When the electromagnetic shutoff valve 15 is operated by an operating unit, not shown, it opens or closes the hydrogen gas passage 12. When pressure downstream of the electromagnetic pressure regulating valve 14 becomes specified pressure (for example, pressure that is higher than normal pressure and lower than withstand pressure of the fuel cell stack 3), the current flowing through the electromagnetic shutoff valve 15 is shut off, so that the electromagnetic shutoff valve 15 shuts off the hydrogen gas passage 12. As above, the electromagnetic shutoff valve 15 is provided upstream of the electromagnetic pressure regulating valve 14, so that these two valves 14 and 15 each having a shutoff function shuts off communication between the hydrogen tank 11 and the fuel cell stack 3. Therefore, the hydrogen gas passage 12 is shut off, and the safety of the hydrogen gas supply device 1 can be further improved.

The safety relief valve 16 is connected to a portion of the hydrogen gas passage 12, the portion being located downstream of the electromagnetic pressure regulating valve 14. The safety relief valve 16 is a so-called relief valve. The safety relief valve 16 operates when pressure in a portion of the hydrogen gas passage 12 becomes higher than the specified pressure, the portion being located downstream of the electromagnetic pressure regulating valve 14. Further, the passage pressure sensor 17 is provided on the hydrogen gas passage 12 so as to be located downstream of the safety relief valve 16. The passage pressure sensor 17 is configured to detect the pressure of the hydrogen gas flowing through the hydrogen gas passage 12. It is preferable that the passage pressure sensor 17 be provided on the hydrogen gas passage 12 so as to be located close to the fuel cell stack 3. The passage pressure sensor 17 is electrically connected to the controller 18 and is configured to transmit the detected pressure to the controller 18.

The controller 18 that is a control unit is connected to an ECU (Electronic Control Unit), not shown, and is configured to receive target pressure from the ECU, the target pressure being determined in accordance with an opening degree (step-on amount) of an accelerator pedal that is one example of an operating unit included in the vehicle. The controller 18 supplies the current to a below-described electromagnetic proportional solenoid 37 of the electromagnetic pressure regulating valve 14 based on the target pressure and the detected pressure and performs feedback control of the detected pressure such that the detected pressure becomes the target pressure. Therefore, by providing the passage pressure sensor 17 close to the fuel cell stack 3, the hydrogen gas of the target pressure can be supplied to the fuel cell stack even if pressure loss occurs in the hydrogen gas passage 12.

When the detected pressure becomes the specified pressure, the controller 18 causes the electromagnetic pressure regulating valve 14 to shut off the hydrogen gas passage 12. In the present embodiment, since the electromagnetic pressure regulating valve 14 is a normally closed valve as described below, the hydrogen gas passage 12 is shut off by shutting off the current supplied from the controller 18 to the electromagnetic pressure regulating valve 14. With this, the high-pressure hydrogen gas of pressure higher than the withstand pressure of the fuel cell stack 3 can be prevented from being supplied to the fuel cell stack 3.

Hereinafter, the configuration of the electromagnetic pressure regulating valve 14 controlled as above will be explained in detail. In the following explanations, the concept of directions, such as upper, lower, left, right, front, and rear directions, is used for convenience of explanation and does not indicate that the arrangements, directions, and the like of components of the electromagnetic pressure regulating valve 14 are limited to such directions. In addition, the electromagnetic pressure regulating valve 14 explained below is just one embodiment of the electromagnetic pressure regulating valve, and the present invention is not limited to the embodiments below. Additions, eliminations, and modifications may be made within the spirit of the present invention.

Electromagnetic Pressure Regulating Valve

Figure 2:
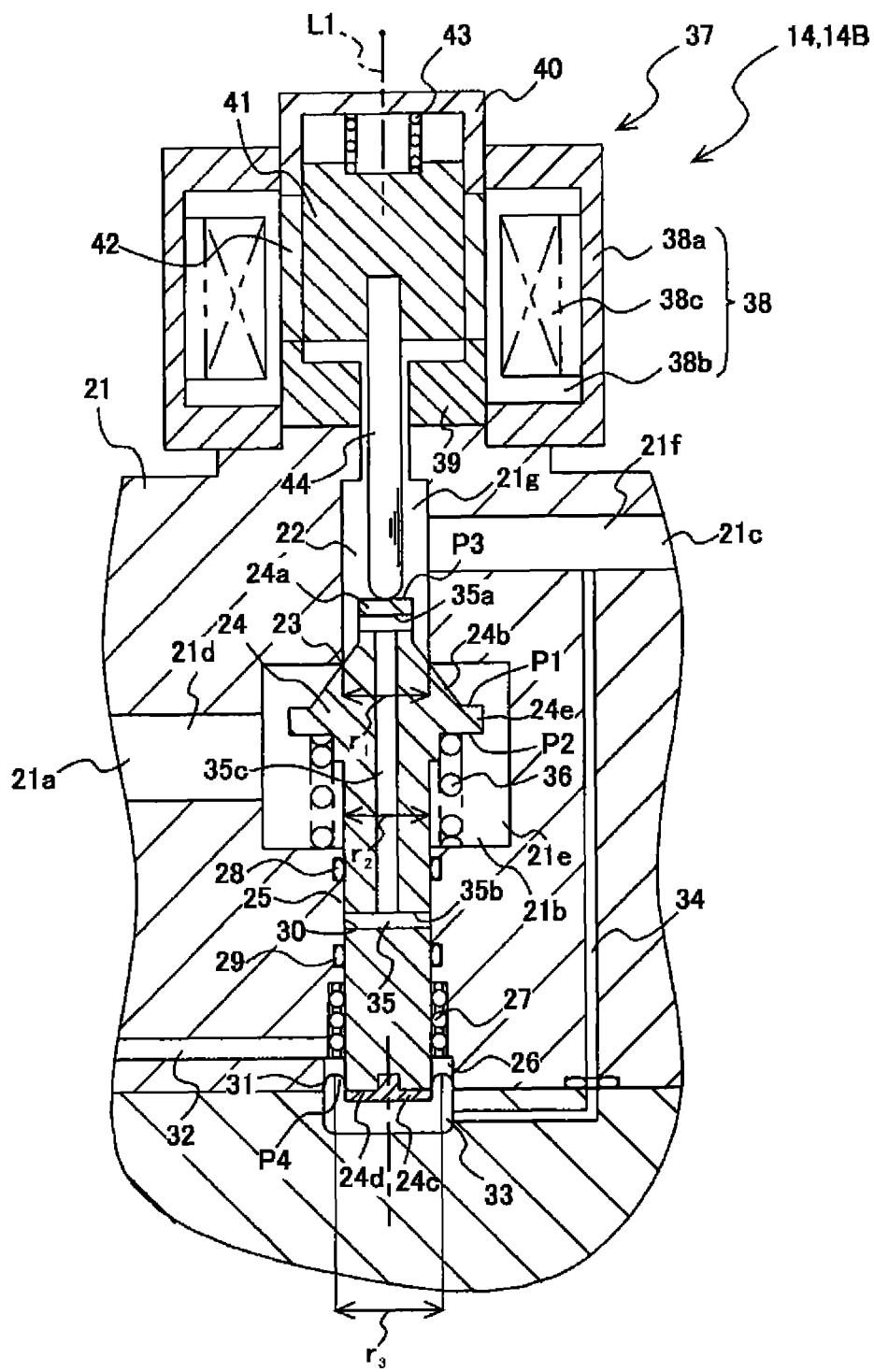
FIG. 2 is a cross-sectional view showing the configuration of an electromagnetic pressure regulating valve included in the hydrogen gas supply device of Embodiment 1.

As shown in FIG. 2, the electromagnetic pressure regulating valve 14 includes a housing 21. The housing 21 includes a primary port 21a, a valve body hole 21b, and a secondary port 21c. The primary port 21a is connected to the electromagnetic shutoff valve 15 (see FIG. 1) and also connected to the valve body hole 21b through a primary passage 21d formed in the housing 21.

The valve body hole 21b extends along an axis line L1 extending in the upper-lower direction. The valve body hole 21b has a circular cross section and includes a valve space 21e at an intermediate portion thereof, the valve space 21e being larger in diameter than the other portion of the valve body hole 21b. The primary passage 21d is connected to the valve space 21e. The valve body hole 21b is connected to the secondary port 21c through a secondary passage 21f formed in the housing 21. The secondary passage 21f is connected to the valve body hole 21b at a secondary region 21g located above the valve space 21e. The secondary port 21c is connected to the fuel cell stack 3 through the hydrogen gas passage 12 (see FIG. 1). As above, the primary port 21a and the secondary port 21c are connected to each other through the primary passage 21d, the valve space 21e, the secondary region 21g, and the secondary passage 21f. The primary passage 21d, the valve space 21e, the secondary region 21 g, and the secondary passage 21f constitute a valve passage 22 configured to connect the primary port 21a and the secondary port 21c.

The housing 21 includes a seat portion 23. The seat portion 23 is located in the vicinity of an opening connecting the secondary region 21g and the valve space 21e and is formed to surround this opening. A valve body 24 is inserted in the housing 21 along the axis line L1 of the valve body hole 21b. The valve body 24 is seated (pressed) on the seat portion 23 such that an upper end portion 24a that is one end portion of the valve body 24 is inserted in the secondary region 21g. The valve body 24 has a substantially columnar shape, and the upper end portion 24a is located on the valve passage 22 side, that is, located at the secondary passage 21f located on the secondary port 21a side of the valve passage 22. The valve body 24 includes a tapered portion 24b located on the upper end portion 24a side. The tapered portion 24b has a tapered shape toward an upper side. When the valve body 24 is located at a closed position as shown in FIG. 2, the valve body 24 is seated on the seat portion 23 to close the valve passage 22.

The housing 21 includes a seal attaching portion 25 located below the valve space 21e. The seal attaching portion 25 is formed on an inner surface of the housing 21 along the entire periphery in a circumferential direction. An inner diameter of the seal attaching portion 25 is substantially equal to each of a hole diameter of the secondary region 21g and an outer diameter of the valve body 24. An inner diameter of a portion of the housing 21 located below the seal attaching portion 25 is larger than the inner diameter of the seal attaching portion 25. With this, a bearing member accommodating space 26 having a substantially annular shape is formed between the housing 21 and the valve body 24, and a bearing member 27 is accommodated in the bearing member accommodating space 26.

The bearing member 27 is formed to have a substantially cylindrical shape and is constituted by a ball guide, ball bearing, a slide bearing, or the like. The bearing member 27 is externally attached to the valve body 24, interposed between the valve body 24 and the housing 21, and supports the valve body 24. By the bearing member 27, the valve body 24 can move smoothly in the housing 21 along the axis line L1 in the upper-lower direction. In order to further smoothen the movement of the valve body 24 and improve the durability of the bearing member 27, the bearing member 27 is lubricated with grease.

In order to seal the bearing member accommodating space 26, a high-pressure sealing member 28 is provided on an upper side of the bearing member accommodating space 26 in which the bearing member 27 is provided as above. The high-pressure sealing member 28 that is a first sealing member is a high-pressure seal which is low in frictional resistance and in which a difference between starting resistance and sliding resistance is small. One example of the high-pressure sealing member 28 is an O ring subjected to a surface treatment by, for example, fluorocarbon resin. The high-pressure sealing member 28 is attached so as to be fitted in an inner peripheral portion of the seal attaching portion 25 and is provided on an outer periphery of the valve body 24. The high-pressure sealing member 28 provided as above seals a gap between the valve body 24 and the seal attaching portion 25. In addition, a low-pressure sealing member 29 is provided at the seal attaching portion 25.

The low-pressure sealing member 29 that is a second sealing member is an O ring having a substantially annular shape and is subjected to a surface treatment by, for example, resin in order to reduce the frictional resistance. The low-pressure sealing member 29 is located closer to the bearing member 27 than the high-pressure sealing member 28 and is attached so as to be fitted in the inner peripheral portion of the seal attaching portion 25. With this, the high-pressure sealing member 28 and the low-pressure sealing member 29 are provided on the outer periphery of the valve body 24 in this order from the upper end side of the valve body 24 to the lower end side thereof (to be specific, from one end side to the other end side). The low-pressure sealing member 29 seals a gap between the seal attaching portion 25 and the valve body 24, and a buffer chamber 30 is formed between the high-pressure sealing member 28 and the low-pressure sealing member 29. The hydrogen gas having leaked through the high-pressure sealing member 28 is introduced to the buffer chamber 30 that is a first space. The high-pressure sealing member 28 and the low-pressure sealing member 29 may be attached so as to be fitted in an outer peripheral portion of the valve body 24.

In addition, in order to seal the bearing member accommodating space 26, a diaphragm seal 31 is provided on a lower side of the bearing member accommodating space 26. The diaphragm seal 31 that is a third sealing member is a diaphragm formed to have a substantially annular shape and is provided on the outer periphery of the valve body 24. An inner edge portion of the diaphragm seal 31 is attached to the valve body 24, and an outer edge portion thereof is attached to the housing 21. More specifically, the inner edge portion of the diaphragm seal 31 is attached to the valve body 24 so as to be sandwiched between a lower end portion of the valve body 24 and an attaching member 24c attached to the lower end portion of the valve body 24. The housing 21 is configured to be separable into two parts that are upper and lower portions. The outer edge portion of the diaphragm seal 31 is attached to the housing 21 so as to be sandwiched between these two parts.

The bearing member accommodating space 26 whose upper and lower sides are sealed as above is shut off and separated by two sealing members 31 and 29 from other spaces (for example, the valve space 21e and the secondary region 21g) formed in the housing 21. The bearing member accommodating space 26 that is a second space is open to the atmosphere through an atmosphere communication passage 32 formed in the housing 21. Therefore, the grease for lubricating the bearing member 27 is not exposed to the hydrogen gas and does not leak to the other spaces, such as the valve space 21c and the secondary port 21c, formed in the housing 21. On this account, the grease can be prevented from being mixed with the hydrogen gas, and influences of the grease on downstream devices can be prevented. In addition, the grease can be prevented from drying up, and a good lubrication state of the bearing member 27 can be maintained. Thus, the durability of the bearing member 27 can be improved, and the valve body 24 can be moved smoothly.

A pressure return chamber 33 is formed at a portion of the valve body hole 21b, the portion being located on a lower side of the diaphragm seal 31. The pressure return chamber 33 is a substantially disc-shaped space surrounded by a bottom portion of the housing 21 and the diaphragm seal 31. The lower end portion that is the other end portion of the valve body 24 is located in the pressure return chamber 33 formed in the housing 21 as above. The diaphragm seal 31 seals between the pressure return chamber 33 and the bearing member accommodating space 26, and the pressure return chamber 33 is connected to the secondary passage 21f through a housing pressure equalizing passage 34 (second pressure equalizing passage) formed in the housing 21.

A valve pressure equalizing passage 35 is formed in the valve body 24. The valve pressure equalizing passage 35 that is a first pressure equalizing passage includes a secondary side communication portion 35a, a return portion 35b, and a communication portion 35c. The secondary side communication portion 35a extends so as to penetrate the upper end portion 24a of the valve body 24 in a radial direction of the valve body 24, and both ends thereof are open to the secondary region 21g. The return portion 35b extends so as to penetrate the valve body 24 in the radial direction, and both ends thereof are open to the buffer chamber 30. The secondary side communication portion 35a and the return portion 35b are connected to each other through the communication portion 35c formed along an axis (which substantially coincides with the axis line L1 in the present embodiment) of the valve body 24. With this, the buffer chamber 30 is connected to the secondary region 21g through the valve pressure equalizing passage 35.

As above, the housing pressure equalizing passage 34 connects the secondary port 21c and the pressure return chamber 33 and introduces secondary pressure $p_2$, introduced to the secondary port 21c, to the pressure return chamber 33. The valve pressure equalizing passage 35 connects the secondary port 21c and the buffer chamber 30 and introduces the hydrogen gas, having leaked to the buffer chamber 30, to the secondary port 21c. With this, the electromagnetic pressure regulating valve 14 is configured as a pressure regulating valve having a safety structure by which the hydrogen gas having leaked from a primary side is returned to a secondary side without causing the leakage to the outside.

The valve body 24 includes a flange 24e. The flange 24e is formed below the tapered portion 24b along the entire periphery of the valve body 24 in the circumferential direction and projects further from the tapered portion 24b in a radially outward direction. The flange 24e is located so as to be opposed to an upper end of the seal attaching portion 25. A return spring 36 is provided between the flange 24e and the upper end of the seal attaching portion 25. The return spring 36 is a so-called compression coil spring, is externally attach to the valve body 24 in a compressed state, and biases the valve body 24 in a direction toward the closed position (in such a direction that the valve body 24 moves toward the closed position). The biased valve body 24 is seated on the seat portion 23 to close the valve passage 22. The electromagnetic proportional solenoid 37 is provided at an opening end portion (that is, an upper end portion) of the housing 21 in order to apply to the valve body 24 a force against the biasing of the return spring 36.

The electromagnetic proportional solenoid 37 that is a valve body driving unit is threadedly engaged with and fixed to an outer periphery of the opening end portion of the housing 21. The electromagnetic proportional solenoid 37 includes a solenoid coil 38. The solenoid coil 38 is formed to have a substantially cylindrical shape, and the housing 21 is threadedly engaged with a lower end side of the solenoid coil 38. The solenoid coil 38 includes a substantially cylindrical case 38a, and a bobbin 38b and a coil wire 38c are provided in the case 38a. The bobbin 38b is formed to also have a substantially cylindrical shape. The solenoid coil 38 is constituted by winding the coil wire 38c around the bobbin 38b. The coil wire 38c is electrically connected to the controller 18. A yoke 39 is provided in the solenoid coil 38 so as to be located at a lower end portion of the solenoid coil 38, and an upper end portion of the solenoid coil 38 is closed by a cover 40. A movable member 41 is provided between the yoke 39 and the cover 40.

The movable member 41 is made of a magnetic material and is formed to have a substantially columnar shape. The movable member 41 is provided along the axis line L1. An outer diameter of the movable member 41 is smaller than an inner diameter of the solenoid coil 38. A guide member 42 having an annular shape is interposed between the movable member 41 and the solenoid coil 38. The guide member 42 is made of a non-magnetic material and supports the movable member 41 such that the movable member 41 can slide along the axis line L1 in the upper-lower direction. The yoke 39 is opposed to a lower end portion of the movable member 41 in the upper-lower direction so as to be spaced apart from the lower end portion of the movable member 41. The yoke 39 is made of a magnetic material, such as electromagnetic stainless steel, and is formed to have a substantially annular shape. The yoke 39 and the movable member 41 are magnetized by supplying a current to the solenoid coil 38, and the yoke 39 attracts the movable member 41.

A compression coil spring 43 is provided between an upper end portion of the movable member 41 and the cover 40. The movable member 41 is being biased toward the valve body 24 by the compression coil spring 43. A pushing member 44 is provided at the lower end portion of the movable member 41. The pushing member 44 extends along the axis line L1 and is inserted through the yoke 39. A base end portion of the pushing member 44 is fixed to the movable member 41. A tip end of the pushing member 44 is formed to have a partially spherical shape. The pushing member 44 is biased by the compression coil spring 43 via the movable member 41, and the tip end thereof is pressed on the upper end portion 24a of the valve body 24. By supplying the current to the solenoid coil 38, the movable member 41 is attracted toward the yoke 39, and the pushing member 44 provided as above pushes the valve body 24 in a direction toward an open position by a force corresponding to the supplied current. Thus, the valve passage 22 opens.

In the electromagnetic pressure regulating valve 14 configured as above, the tapered portion 24b of the valve body 24 and an upper surface of the flange 24e (that is, a pressure receiving surface P1 corresponding to a first pressure receiving surface) receive primary pressure $p_1$, having been introduced from the hydrogen tank 11 to the valve space 21e, in the direction toward the open position, and a lower surface of the flange 24e (that is, a pressure receiving surface P2 corresponding to a second pressure receiving surface) receives the primary pressure $p_1$ in the direction toward the closed position. The pressure receiving surface P1 is a partial region of the tapered surface, the region being located on a radially outer side of the secondary region 21g in plan view. The primary pressure $p_1$ applied to the pressure receiving surface P1 and the primary pressure $p_1$ applied to the pressure receiving surface P2 respectively act in directions opposite to each other and cancel each other. The pressure receiving areas of the pressure receiving surfaces P1 and P2 are substantially equal to each other since an outer diameter of a portion of the valve body 24 and the inner diameter (to be specific, a seat diameter) of the secondary region 21g are substantially equal to each other, the portion being located on a lower end 24d side of the flange 24e. Therefore, an acting force generated by the primary pressure $p_1$ received by the pressure receiving surface P1 and an acting force generated by the primary pressure $p_1$ received by the pressure receiving surface P2 cancel each other, so that influences due to the change in the primary pressure $p_1$ on the valve body 24 can be prevented.

In the electromagnetic pressure regulating valve 14, an upper end of the valve body 24 and a tapered surface of the tapered portion 24b (that is, a pressure receiving surface P3) receive in the direction toward the open position the secondary pressure $p_2$ flowing in the secondary region 21g, and the diaphragm seal 31 and the lower end 24d of the valve body 24 (that is, a pressure receiving surface P4) receive in the direction toward the closed position the secondary pressure $p_2$ introduced to the pressure return chamber 33. The pressure receiving surface P4 is a region overlapping the secondary region 21g in plan view. The secondary pressure $p_2$ applied to the pressure receiving surface P3 and the secondary pressure $p_2$ applied to the pressure receiving surface P4 respectively act in directions opposite to each other.

However, the valve body 24 has an outer diameter $r_2$ substantially equal to a seat diameter $r_1$, and an effective diameter $r_3$ of the diaphragm seal 31 is larger than each of the seat diameter $r_1$ and the outer diameter $r_2$ of the valve body 24. Therefore, the pressure receiving area of the pressure receiving surface P4 is larger than that of the pressure receiving surface P3 by an effective area of the diaphragm seal 31. With this, an acting force generated by the secondary pressure $p_2$ received by the pressure receiving surface P3 and an acting force generated by the secondary pressure $p_2$ received by the pressure receiving surface P4 do not completely cancel each other, and an acting force corresponding to the difference between the pressure receiving areas of the pressure receiving surfaces P3 and P4 acts on the valve body 24 in the direction toward the closed position. In addition, the valve body 24 is biased by the return spring 36 in the direction toward the closed position to be seated on the seat portion 23. As above, the valve body 24 is biased by the return spring 36 and the acting force generated by the secondary pressure $p_2$ in the direction toward the closed position. Thus, the electromagnetic pressure regulating valve 14 is constituted as a normally closed valve. With this, the valve passage 22 can be urgently shut off by shutting off the supply of the current to the solenoid coil 38.

Operations of Electromagnetic Pressure Regulating Valve

Hereinafter, operations of the electromagnetic pressure regulating valve 14 will be explained in reference to FIG. 2, when the accelerator pedal of the vehicle is operated, a current corresponding to this operation amount (to be specific, a current corresponding to the target pressure) is supplied from the controller 18 to the solenoid coil 38. Then, a magnetizing force acts on the movable member 41, and the movable member 41 is attracted toward the yoke 39. With this, the valve body 24 is pushed by the pushing member 44 in the direction toward the open position to be separated from the seat portion 23. Then, the valve passage 22 opens, and the hydrogen gas in the valve space 21e flows to the secondary region 21g. At this time, by an orifice (not shown) formed between the valve body 24 and the seat portion 23, the pressure of the hydrogen gas flowing from the valve space 21e to the secondary region 21g is reduced to the secondary pressure $p_2$. As above, the electromagnetic pressure regulating valve 14 is configured such that when the current is supplied to the solenoid coil 38, the valve body 24 is pushed by the pushing member 44, and the valve passage opens (that is, the electromagnetic pressure regulating valve 14 is a push-type electromagnetic pressure regulating valve).

The hydrogen gas in the secondary region 21g flows through the secondary passage 21f to be discharged through the secondary port 21c and also flows through the housing pressure equalizing passage 34 to be introduced to the pressure return chamber 33. The diaphragm seal 31 receives the secondary pressure $p_2$ of the hydrogen gas introduced to the pressure return chamber 33. The valve body 24 moves up to a position where the magnetizing force received by the movable member 41, the acting force generated by the secondary pressure $p_2$ received by the pressure receiving surface P3, the acting force generated by the secondary pressure $p_2$ received by the pressure receiving surface P4, the spring force of the compression coil spring 43, and the spring force of the return spring 36 are balanced. To be specific, in order to balance the above forces, the opening degree of the valve passage 22 (to be specific, the opening degree of the orifice) is adjusted. Thus, the secondary pressure $p_2$ of the hydrogen gas flowing to the secondary region 21g is adjusted. With this, the secondary pressure $p_2$ is controlled to become pressure corresponding to the operation amount of the accelerator pedal, that is, the target pressure.

A case where the secondary pressure $p_2$ is adjusted will be specifically explained. For example, in a case where the secondary pressure $p_2$ is lower than the target pressure, the magnetizing force is higher than the acting force generated by the secondary pressure P2, the valve body 24 moves in a direction away from the seat portion 23, that is, in the direction toward the open position. The valve body 24 moves up to a position where the acting force generated by the secondary pressure $p_2$, the magnetizing force, the spring force of the compression coil spring 43, and the spring force of the return spring 36 are balanced. With this, the opening degree of the valve passage 22 increases, and the secondary pressure $p_2$ increases. Thus, the secondary pressure $p_2$ is regulated to the target pressure. Therefore, even if the primary pressure $p_1$ changes, the electromagnetic pressure regulating valve 14 can control the opening degree of the valve passage 22 in accordance with the change in the primary pressure $p_1$ to regulate the secondary pressure $p_2$ to the target pressure. On this account, the pressure of the high-pressure hydrogen gas can be reduced and regulated up to the low target pressure only by the electromagnetic pressure regulating valve 14 with a high degree of accuracy.

The same is true for a case where the accelerator pedal is operated, the operation amount thereof is changed, and the target pressure received by the controller 18 is changed. To be specific, the target pressure changes, and the current supplied to the solenoid coil 38 by the controller 18 increases or decreases. Then, the magnetizing force increases or decreases, and the valve body 24 moves up to a position where the magnetizing force, the acting force generated by the secondary pressure $p_2$, the spring force of the compression coil spring 43, and the spring force of the return spring 36 are balanced. Thus, the opening degree of the valve passage 22 is adjusted. With this, the secondary pressure $p_2$ is regulated so as to correspond to the changed target pressure. As above, the electromagnetic pressure regulating valve 14 can regulate the secondary pressure $p_2$ such that the secondary pressure $p_2$ follows the changing target pressure and can maintain the secondary pressure $p_2$ at the target pressure.

In the electromagnetic pressure regulating valve 14 configured as above, since the pressure receiving areas of the pressure receiving surface P1 and the pressure receiving surface P2 are substantially the same as each other, the acting forces generated by the primary pressure $p_1$ received by the valve body 24 cancel each other. With this, the change in the secondary pressure $p_2$ due to the change in the primary pressure $p_1$ can be suppressed. Therefore, the pressure controllability with respect to the high-pressure hydrogen gas can be improved, and the secondary pressure $p_2$ can be controlled with a high degree of accuracy as with the conventional electromagnetic pressure regulating valves. By canceling the acting forces generated by the primary pressure $p_1$, the magnetizing force of the electromagnetic proportional solenoid 37 can be reduced, and the electromagnetic pressure regulating valve 14 can be reduced in size.

In the electromagnetic pressure regulating valve 14, the differential pressure between the primary pressure $p_1$ and the secondary pressure $p_2$ is high. Therefore, during the operation of the electromagnetic pressure regulating valve 14, the hydrogen gas slightly leaks by an unintended external factor from the valve space 21e through the high-pressure sealing member 28 to the buffer chamber 30 in some cases. However, the buffer chamber 30 is connected to the secondary region 21g through the valve pressure equalizing passage 35, and the electromagnetic pressure regulating valve 14 has the safety structure by which the hydrogen gas having leaked through the high-pressure sealing member 28 is discharged from the secondary port to be introduced to the fuel cell stack. Since the buffer chamber 30 is connected to the secondary region 21g in the electromagnetic pressure regulating valve 14, the internal pressure of the buffer chamber 30 is low. Therefore, even if the hydrogen gas leaks through the high-pressure sealing member 28 to the buffer chamber 30, the internal pressure of the buffer chamber 30 is less likely to increase. On this account, even if the hydrogen gas leaks from the primary side to the buffer chamber 30, the low-pressure sealing member 29 can adequately prevent the hydrogen gas from leaking to the bearing member accommodating space 26. To be specific, the hydrogen gas can be prevented from leaking through the bearing member accommodating space 26 to the atmosphere.

By adopting the diaphragm seal 31, the sliding friction generated when the valve body 24 moves can be eliminated. In addition, by adopting the low-pressure sealing member 29 which is low in the frictional resistance, the sliding friction can be reduced as much as possible. The valve body 24 can be caused to move smoothly by reducing the sliding friction acting on the valve body 24 as above. With this, the secondary pressure can be quickly regulated to the target pressure. Thus, the responsiveness of the secondary pressure is improved. Further, by adopting the high-pressure sealing member 28, the pressure resistance of the electromagnetic pressure regulating valve 14 with respect to the primary pressure $p_1$ is improved.

Embodiment 2

Figure 3:
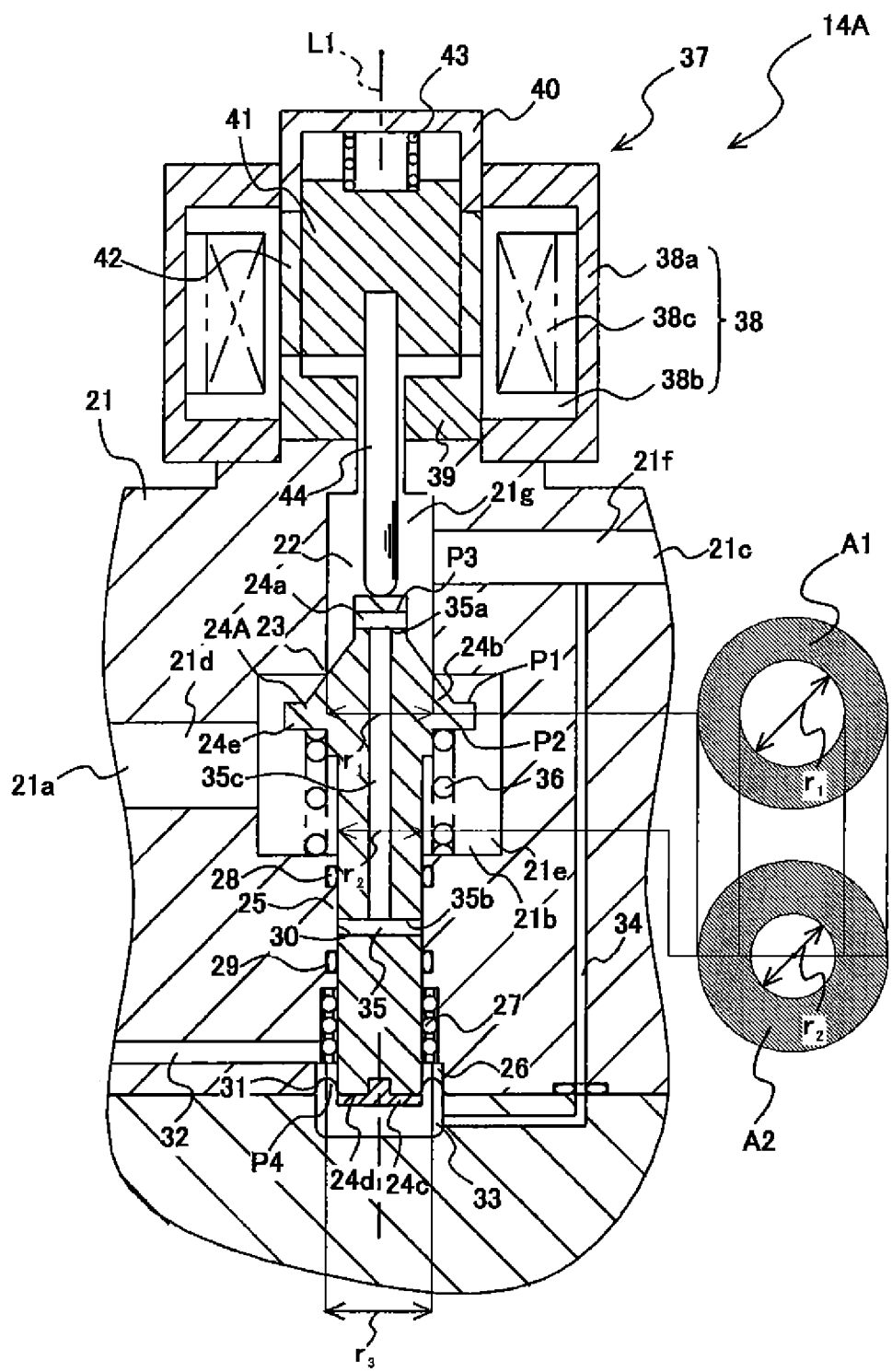
FIG. 3 is a cross-sectional view showing the configuration of the electromagnetic pressure regulating valve included in the hydrogen gas supply device of Embodiment 2.

The hydrogen gas supply device 1A according to Embodiment 2 is similar in configuration to the hydrogen gas supply device 1 according to Embodiment 1 but is different from the hydrogen gas supply device 1 according to Embodiment 1 in that as shown in FIG. 3, a pressure receiving area A1 and pressure receiving area A2 of the electromagnetic pressure regulating valve 14 included in the hydrogen gas supply device 1A are different from each other. Hereinafter, the difference therebetween will be explained in detail.

In an electromagnetic pressure regulating valve 14A of the hydrogen gas supply device 1A according to Embodiment 2, the outer diameter $r_2$ of a valve body 14A is smaller than the seat diameter $r_1$. Therefore, the pressure receiving area of the pressure receiving surface P1 is smaller than that of the pressure receiving surface P2. On this account, the acting force generated by the primary pressure $p_1$ corresponding to the difference between the pressure receiving areas of the pressure receiving surfaces P1 and P2 acts on the valve body 24 toward the closed position. Thus, the speed of the valve body 24A moving toward the closed position when the supply of the current to the solenoid coil 38 is shut off increases, and the shutoff performance is improved.

Since the acting force generated by the primary pressure $p_1$ acts toward the closed position, sealing surface pressure between the valve body 24A and a seat portion of the seat portion 23 increases. Therefore, the electromagnetic pressure regulating valve 14A can firmly close the valve passage 22 so as to prevent the fuel gas from leaking from the primary side to the secondary side.

Other than the above, the hydrogen gas supply device 1A according to Embodiment 2 has the same operational advantages as the hydrogen gas supply device 1 according to Embodiment 1.

Embodiment 3

The hydrogen gas supply device 1B according to Embodiment 3 is similar in configuration to the hydrogen gas supply device 1 according to Embodiment 1. Therefore, regarding the hydrogen gas supply device 1B according to Embodiment 3, only components different from the components of the hydrogen gas supply device 1 according to Embodiment 1 will be explained.

Figure 4:
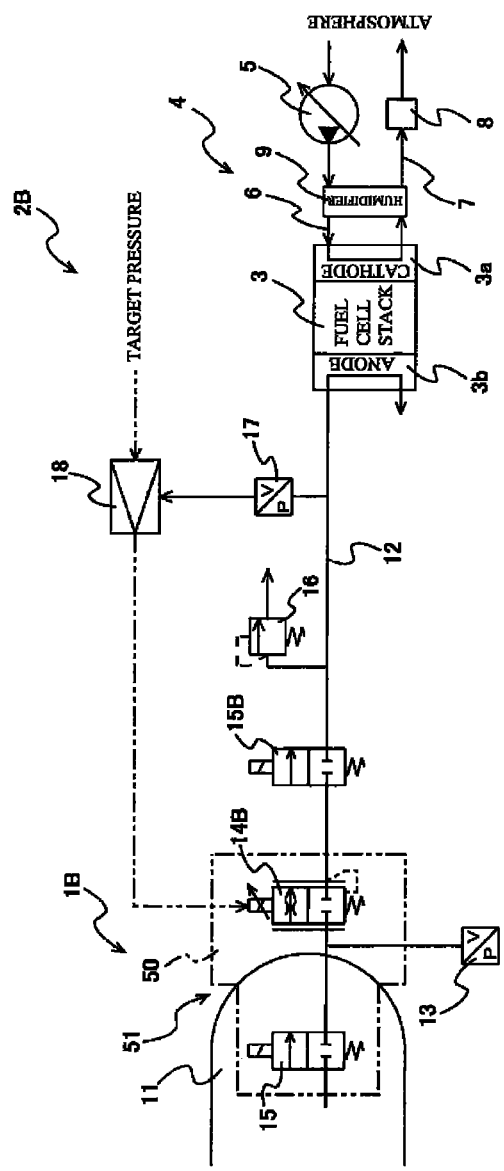
FIG. 4 is a circuit diagram showing the configuration of the fuel cell system including the hydrogen gas supply device of Embodiment 3.

The hydrogen gas supply device 1B included in the fuel cell system 2B includes an electromagnetic pressure regulating valve 14B. The electromagnetic pressure regulating valve 14B is an on tank type pressure regulating valve and is provided at an opening portion of the hydrogen tank 11. The electromagnetic pressure regulating valve 14B has the same configuration as the electromagnetic pressure regulating valve 14 of Embodiment 1 and includes the housing 21 (see FIG. 2) formed integrally with a valve block 50. The valve block 50 is attached to the opening portion of the hydrogen tank 11 (see FIG. 4) in a sealed state.

As with the electromagnetic pressure regulating valve 14 of Embodiment 1, the electromagnetic pressure regulating valve 14B has a function of regulating the pressure of the high-pressure hydrogen gas, flowing out from the hydrogen tank 11, to low pressure to supply the hydrogen gas to the fuel cell stack 3. Therefore, by providing the electromagnetic pressure regulating valve 14B at the opening portion of the hydrogen tank 11, the pressure level output from the hydrogen tank 11 becomes low, and the safety of the hydrogen gas supply device 1B is improved significantly.

The electromagnetic shutoff valve 15 is provided upstream of the electromagnetic pressure regulating valve 14B. The electromagnetic shutoff valve 15 is formed integrally with the valve block 50 together with the electromagnetic pressure regulating valve 14B. The electromagnetic shutoff valve 15 and the electromagnetic pressure regulating valve 14B constitute an electromagnetic container master valve 51. An electromagnetic shutoff valve 15B is provided downstream of the electromagnetic pressure regulating valve 14B. The electromagnetic shutoff valve 15B is a low-pressure solenoid valve having a function of opening and closing the hydrogen gas passage 12 as with the electromagnetic shutoff valve 15. Since the low-pressure solenoid valve can be adopted as the electromagnetic shutoff valve 15B, the manufacturing cost of the electromagnetic shutoff valve 15B can be made lower than that of the electromagnetic shutoff valve 15.

Further, it is desirable that the electromagnetic shutoff valve 15B be, for example, a direct-drive solenoid valve which opens only at specified pressure or lower and is low in the manufacturing cost (a single-stage solenoid valve in which a thrust force of an electromagnetic solenoid is reduced and which does not open when the pressure exceeds the specified pressure). If some kind of abnormality (for example, the leakage of the high-pressure hydrogen gas by an unintended external factor during the operation of the electromagnetic pressure regulating valve 14B) occurs on the electromagnetic pressure regulating valve 14B during the stop of the vehicle (the fuel cell system 2B), the pressure upstream of the electromagnetic pressure regulating valve 15B increases, and if this upstream pressure exceeds the specified pressure, the electromagnetic shutoff valve 15B does not open at the time of the next start-up of the vehicle. Therefore, in a case where the direct-drive solenoid valve is used as the electromagnetic shutoff valve 15B, the hydrogen gas having higher pressure than the specified pressure can be prevented from flowing to the fuel cell stack 3. With this, the fuel cell stack 3 can be protected. In addition, since the electromagnetic shutoff valve 15B does not open, the abnormality of the electromagnetic pressure regulating valve can be presumed and detected without using a pressure sensor.

Other than the above, the hydrogen gas supply device 1B according to Embodiment 3 has the same operational advantages as the hydrogen gas supply device 1 according to Embodiment 1.

Embodiment 4

The hydrogen gas supply device 1C according to Embodiment 4 is similar in configuration to the hydrogen gas supply device 1B according to Embodiment 3. Therefore, regarding the hydrogen gas supply device 1C according to Embodiment 4, only components different from the components of the hydrogen gas supply device 1B according to Embodiment 3 will be explained.

Figure 5:
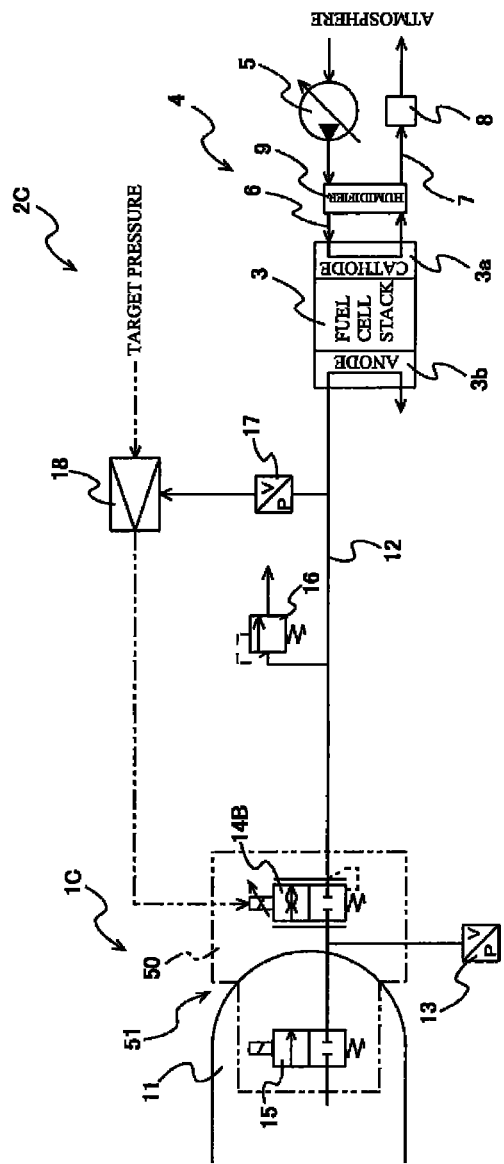
FIG. 5 is a circuit diagram showing the configuration of the fuel cell system including the hydrogen gas supply device of Embodiment 4.

As shown in FIG. 5, the electromagnetic shutoff valve 15B is not included in the hydrogen gas supply device 1C included in the fuel cell system 2C. The electromagnetic pressure regulating valve 14B is a normally closed valve and shuts off the hydrogen gas passage 12 when the pressure downstream of the electromagnetic pressure regulating valve 14B becomes equal to or higher than the specified pressure. Therefore, even in the case of the configuration in which the electromagnetic shutoff valve 15B is not included as in the case of the hydrogen gas supply device 1C, the hydrogen gas having higher pressure than the specified pressure can be prevented from flowing to the fuel cell stack 3.

Other than the above, the hydrogen gas supply device 1C according to Embodiment 4 has the same operational advantages as the hydrogen gas supply device 1B according to Embodiment 3.

Embodiment 5

The hydrogen gas supply device 1D according to Embodiment 5 is similar in configuration to the hydrogen gas supply device 1 according to Embodiment 1. Therefore, regarding the hydrogen gas supply device 1D according to Embodiment 5, only components different from the components of the hydrogen gas supply device 1 according to Embodiment 1 will be explained.

Figure 6:
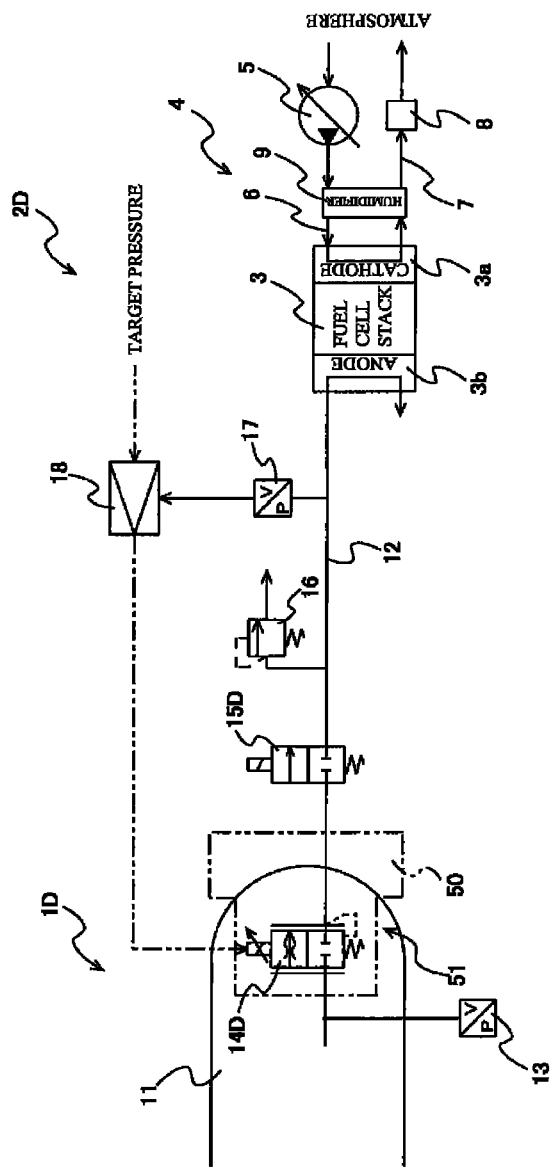
FIG. 6 is a circuit diagram showing the configuration of the fuel cell system including the hydrogen gas supply device of Embodiment 5.

As shown in FIG. 6, the hydrogen gas supply device 1D included in the fuel cell system 2D includes an electromagnetic pressure regulating valve 14D. The electromagnetic pressure regulating valve 14D is an in tank type pressure regulating valve and is provided in the opening portion of the hydrogen tank 11. As with the electromagnetic pressure regulating valve 14 of Embodiment 1, the electromagnetic pressure regulating valve 14D has a function of regulating the pressure of the high-pressure hydrogen gas, flowing out from the hydrogen tank 11, to low pressure to supply the hydrogen gas to the fuel cell stack 3. By providing the electromagnetic pressure regulating valve 14D in the hydrogen tank 11, the pressure level output from the hydrogen tank 11 becomes low, and the safety of the hydrogen gas supply device 1D is further significantly improved. In the hydrogen gas supply device 1D, an electromagnetic shutoff valve 15D is provided downstream of the electromagnetic pressure regulating valve 14D. Therefore, a low-pressure electromagnetic shutoff valve can be used as the electromagnetic shutoff valve 15D.

Therefore, the hydrogen gas supply device 1D according to Embodiment 5 has the same operational advantages as the hydrogen gas supply device 1 according to Embodiment 1.

Embodiment 6

The hydrogen gas supply device 1E according to Embodiment 6 is similar in configuration to the hydrogen gas supply device 1D according to Embodiment 5. Therefore, regarding the hydrogen gas supply device 1E according to Embodiment 5, only components different from the components of the hydrogen gas supply device 1D according to Embodiment 5 will be explained.

Figure 7:
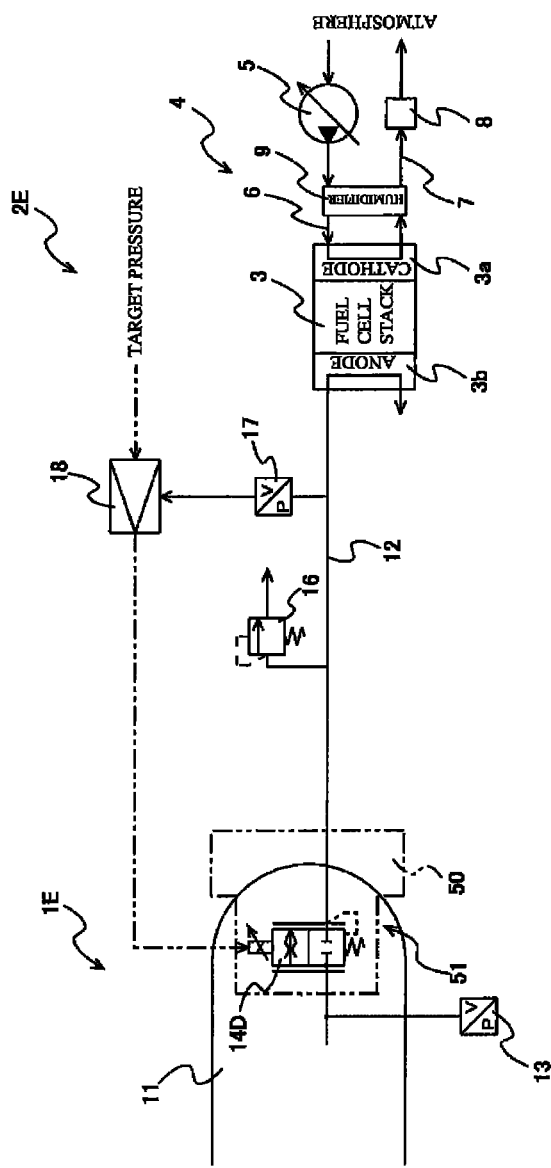
FIG. 7 is a circuit diagram showing the configuration of the fuel cell system including the hydrogen gas supply device of Embodiment 6.

As shown in FIG. 7, the electromagnetic shutoff valve 15D is not included in the hydrogen gas supply device 1E included in the fuel cell system 2E. The electromagnetic pressure regulating valve 14D is a normally closed valve and shuts off the hydrogen gas passage 12 when the pressure downstream of the electromagnetic pressure regulating valve 14D becomes equal to or higher than the specified pressure. Therefore, even in the case of the configuration in which the electromagnetic shutoff valve 15B is not included as in the case of the hydrogen gas supply device 1E, the hydrogen gas having higher pressure than the specified pressure can be prevented from flowing to the fuel cell stack 3.

Other than the above, the hydrogen gas supply device 1E according to Embodiment 6 has the same operational advantages as the hydrogen gas supply device 1D according to Embodiment 5.

Embodiment 7

Figure 8:
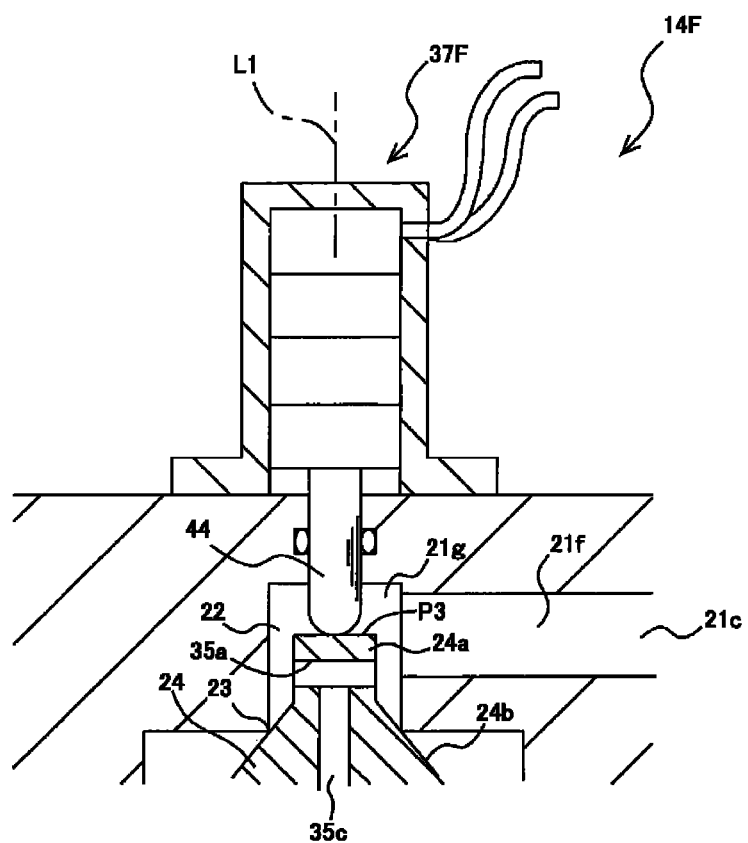
FIG. 8 is an enlarged cross-sectional view showing a part of the configuration of a pressure regulating valve included in the hydrogen gas supply device of Embodiment 7.

The hydrogen gas supply device 1F according to Embodiment 7 includes a pressure regulating valve 14F shown in FIG. 8. The pressure regulating valve 14F includes a piezoelectric actuator 37F instead of the electromagnetic proportional solenoid 37. The piezoelectric actuator 37F is constituted by a piezoelectric element (for example, a piezo element), generates a driving force corresponding to applied voltage, and causes the valve body 24 to move in the direction toward the open position via the pushing member 44 to open the valve passage 22. At this time, the opening degree of the valve passage 22 corresponds to the generated driving force, and the electromagnetic pressure regulating valve 14F can regulate the secondary pressure $p_2$ to pressure corresponding to the applied voltage applied to the piezoelectric actuator 37F.

Other than the above, the hydrogen gas supply device 1F according to Embodiment 7 is the same in configuration as the hydrogen gas supply device 1 according to Embodiment 1. Thus, the hydrogen gas supply device 1F according to Embodiment 7 has the same operational advantages as the hydrogen gas supply device 1 according to Embodiment 1.

Embodiment 8

Figure 9:
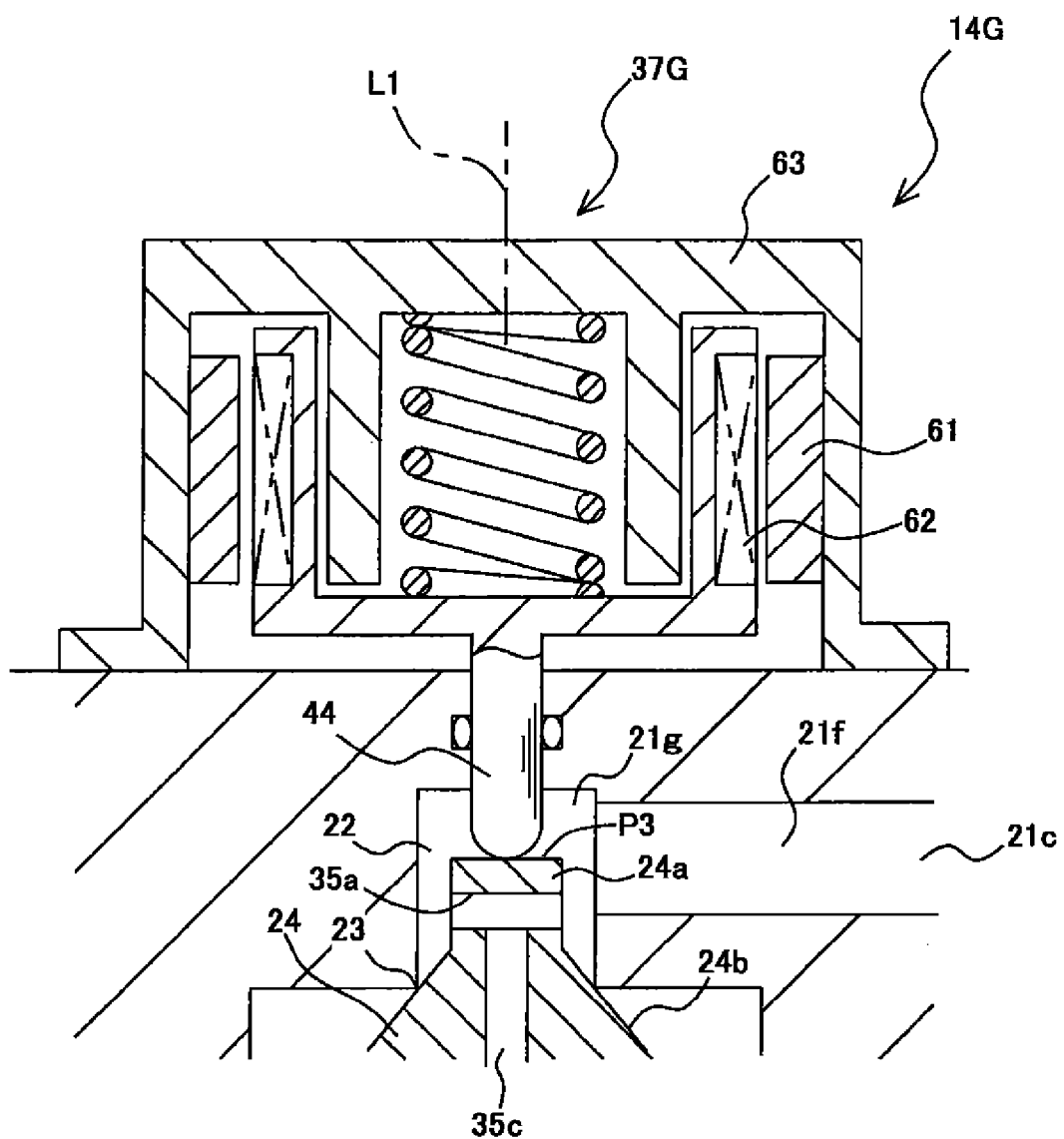
FIG. 9 is an enlarged cross-sectional view showing a part of the configuration of the pressure regulating valve included in the hydrogen gas supply device of Embodiment 8.

The hydrogen gas supply device 1G according to Embodiment 8 includes a pressure regulating valve 14G shown in FIG. 9. The pressure regulating valve 14G includes a force motor 37G instead of the electromagnetic proportional solenoid 37. The force motor 37G is configured such that a moving coil 62 is inserted in a cylindrical permanent magnet 61. When the current is supplied to the moving coil 62, the magnetizing force corresponding to the supplied current is generated. By this magnetizing force, the moving coil 62 moves in a yoke 63 in the lower direction. When the moving coil 62 moves in the lower direction, the valve body 24 is pushed in the direction toward the open position by the pushing member 44 formed integrally with the moving coil 62. Thus, the valve passage 22 opens. At this time, the opening degree of the valve passage 22 corresponds to the generated magnetizing force, and the pressure regulating valve 14G can regulate the secondary pressure $p_2$ to pressure corresponding to the current supplied to the force motor 37G.

Other than the above, the hydrogen gas supply device 1G according to Embodiment 8 is the same in configuration as the hydrogen gas supply device 1 according to Embodiment 1. Thus, the hydrogen gas supply device 1G according to Embodiment 8 has the same operational advantages as the hydrogen gas supply device 1 according to Embodiment 1.

Other Embodiment

In the present embodiment, the diaphragm seal 31 receives the secondary pressure $p_2$ of the pressure return chamber 33. However, the present embodiment is not limited to the diaphragm seal, and a low-pressure sealing member, such as an O ring, may be used. In this case, by making an outer diameter of a lower end side of the valve body 24 larger than the seat diameter, the present embodiment can obtain the same operational advantages as the electromagnetic pressure regulating valve 14 of Embodiment 1.

The electromagnetic pressure regulating valve 14 of the present embodiment is a push-type electromagnetic pressure regulating valve. However, the electromagnetic pressure regulating valve 14 of the present embodiment may be a pull-type electromagnetic pressure regulating valve. Moreover, in the present embodiment, two pressure equalizing passages 34 and 35 are respectively formed in the housing 21 and the valve body 24. However, both of these two pressure equalizing passages 34 and 35 may be formed in one of the valve body 24 and the housing 21.

Each of the electromagnetic pressure regulating valves 14, 14A, 14B, and 14D can control the opening degree of the valve passage 22 by adjusting the current supplied to the electromagnetic proportional solenoid 37 that is the valve body driving unit. However, each of the electromagnetic pressure regulating valves 14, 14A, 14B, and 14D may control the opening degree of the valve passage 22 by adjusting the voltage applied to the electromagnetic proportional solenoid 37. The same is true for the other valve body driving units.

INDUSTRIAL APPLICABILITY

The present invention is applicable to a hydrogen gas supply device of a fuel cell system, the hydrogen gas supply device being configured to supply a hydrogen gas to a fuel cell stack.

REFERENCE SIGNS LIST 1, 1A to 1G hydrogen gas supply device
2, 2B to 2G fuel cell system
3 fuel cell stack
11 hydrogen tank
12 hydrogen gas passage
14, 14A, 14B, 14D electromagnetic pressure regulating valve
14F, 14G pressure regulating valve
15, 15B, 15D electromagnetic shutoff valve
17 passage pressure sensor
18 controller
21 housing
21a primary port
21c secondary port
22 valve passage
24, 24A valve body
24a upper end portion
26 bearing member accommodating space
28 high-pressure sealing member
29 low-pressure sealing member
30 buffer chamber
31 diaphragm seal
32 atmosphere communication passage
33 pressure return chamber
34 housing pressure equalizing passage
35 valve pressure equalizing passage
37 electromagnetic proportional solenoid
37F piezoelectric actuator
37G force motor

The invention claimed is:

1. A hydrogen gas supply device of a fuel cell system configured to supply a hydrogen gas to a fuel cell stack, the hydrogen gas supply device comprising:
a hydrogen gas passage connecting a hydrogen tank configured to store a high-pressure hydrogen gas and a fuel cell stack configured to consume a low-pressure hydrogen gas; and
a pressure regulating valve provided on the hydrogen gas passage and configured to regulate pressure of the hydrogen gas flowing out from the hydrogen tank to supply the hydrogen gas to the fuel cell stack, wherein:
the pressure regulating valve includes
a housing including a valve passage connecting a primary port connected to the hydrogen tank and a secondary port connected to the fuel cell stack,
a valve body provided in the housing and configured to move between a closed position where the valve body closes the valve passage and an open position where the valve body opens the valve passage to control an opening degree of the valve passage, and a first sealing member and a second sealing member provided on an outer periphery of the valve body;

one end side of the valve body is located on the valve passage side, and the other end side of the valve body is located in a pressure return chamber formed in the housing;

the first sealing member and the second sealing member are provided in this order from the one end side of the valve body to the other end side of the valve body;

the pressure regulating valve further includes a first space formed between the first sealing member and the second sealing member and a first pressure equalizing passage directly connecting the secondary port and the first space, and a second pressure equalizing passage connecting the secondary port and the pressure return chamber;

the first pressure equalizing passage is in fluid communication with the secondary port regardless of whether the valve passage is opened or closed;

the valve passage includes a valve space connected to the primary port;

the first sealing member is provided between the valve space and the first space; and the first pressure equalizing passage and the second pressure equalizing passage are formed separately.

2. The hydrogen gas supply device according to claim 1, wherein:

the second pressure equalizing passage formed in the housing; and the valve body includes a secondary side pressure receiving portion on which pressure of the secondary port acts in a direction toward the open position that is a direction in which the valve body moves toward the open position and a pressure return chamber side pressure receiving portion on which pressure of the pressure return chamber acts in a direction toward the closed position that is a direction in which the valve body moves toward the closed position.

3. The hydrogen gas supply device according to claim 2, wherein the pressure regulating valve further includes:

a third sealing member provided on the outer periphery of the valve body so as to be located closer to the other end side of the valve body than the second sealing member;

a second space formed between the third sealing member and the second sealing member;

a bearing member accommodated in the second space; and an atmosphere communication passage connecting the second space and an atmosphere.

4. The hydrogen gas supply device according to claim 3, wherein a pressure receiving area of the pressure return chamber side pressure receiving portion is larger than that of the secondary side pressure receiving portion.

5. The hydrogen gas supply device according to claim 3, wherein:

the third sealing member is a diaphragm seal; and the diaphragm seal is provided at the other end side of the valve body, and the diaphragm seal and the other end side of the valve body constitute the pressure return chamber side pressure receiving portion.

6. The hydrogen gas supply device according to claim 3, wherein:

the valve body includes a first pressure receiving surface configured to receive primary pressure, introduced to the primary port, in the direction toward the open position and a second pressure receiving surface configured to receive the primary pressure in the direction toward the closed position; and a pressure receiving area of the first pressure receiving surface is equal to that of the second pressure receiving surface.

7. The hydrogen gas supply device according to claim 3, wherein:

the valve body includes a first pressure receiving surface configured to receive primary pressure, introduced to the primary port, in the direction toward the open position and a second pressure receiving surface configured to receive the primary pressure in the direction toward the closed position; and a pressure receiving area of the first pressure receiving surface is smaller than that of the second pressure receiving surface.

8. The hydrogen gas supply device according to claim 3, wherein:

the pressure regulating valve includes a return spring configured to bias the valve body in the direction toward the closed position, and a valve body driving unit configured to apply a driving force, corresponding to an applied voltage or an applied current, to the valve body against the biasing of the return spring to cause the valve body to move in the direction toward the open position; and the pressure regulating valve is a normally closed valve configured such that when the applied voltage or the applied current applied to the valve body driving unit is stopped, the valve body moves in the direction toward the closed position by the return spring.

9. The hydrogen gas supply device according to claim 8, further comprising:

a pressure detector provided on the hydrogen gas passage so as to be located downstream of the pressure regulating valve and configured to detect the pressure of the hydrogen gas supplied to the fuel cell stack; and a control unit configured to control the applied voltage or the applied current, applied to the valve body driving unit, in accordance with the pressure detected by the pressure detector to regulate the secondary pressure to target pressure of the fuel cell stack.

10. The hydrogen gas supply device according to claim 9, wherein when the pressure detected by the pressure detector becomes equal to or higher than predetermined specified pressure, the control unit controls the applied voltage or the applied current, applied to the valve body driving unit, to cause the valve body to move toward the closed position.

11. The hydrogen gas supply device according to claim 8, wherein the pressure regulating valve is an in tank type or on tank type container master valve in which the valve body driving unit is provided at a supply port of the high-pressure tank.

12. The hydrogen gas supply device according to claim 1, further comprising an electromagnetic shutoff valve provided on the hydrogen gas passage so as to be located upstream of the pressure regulating valve and configured to be able to shut off supply of the hydrogen gas to the pressure regulating valve.

13. The hydrogen gas supply device according to claim 1, further comprising an electromagnetic shutoff valve provided on the hydrogen gas passage so as to be located downstream of the pressure regulating valve and configured to be able to shut off supply of the hydrogen gas to the fuel cell stack.

14. A hydrogen gas supply device of a fuel cell system configured to supply a hydrogen gas to a fuel cell stack, the hydrogen gas supply device comprising:
- a hydrogen gas passage connecting a hydrogen tank configured to store a high-pressure hydrogen gas and a fuel cell stack configured to consume a low-pressure hydrogen gas; and
- a pressure regulating valve provided on the hydrogen gas passage and configured to regulate pressure of the hydrogen gas flowing out from the hydrogen tank to supply the hydrogen gas to the fuel cell stack, wherein:

the pressure regulating valve includes
- a housing including a valve passage connecting a primary port connected to the hydrogen tank and a secondary port connected to the fuel cell stack, where the housing is configured to be separable into a plurality of parts,
- a valve body provided in the housing and configured to move between a closed position where the valve body closes the valve passage and an open position where the valve body opens the valve passage to control an opening degree of the valve passage, and
- a first sealing member and a second sealing member provided on an outer periphery of the valve body;

one end side of the valve body is located on the valve passage side, and the other end side of the valve body is located in a pressure return chamber formed in the housing;

the first sealing member and the second sealing member are provided in this order from the one end side of the valve body to the other end side of the valve body;

the pressure regulating valve further includes a first space formed between the first sealing member and the second sealing member and a first pressure equalizing passage directly connecting the secondary port and the first space, and a second pressure equalizing passage connecting the secondary port and the pressure return chamber;

the first pressure equalizing passage is in fluid communication with the secondary port regardless of whether the valve passage is opened or closed;

the pressure return chamber is connected to the secondary port through the second pressure equalizing passage, which is formed in at least two of the plurality of parts of the housing;

the valve passage includes a valve space connected to the primary port;

the first sealing member is provided between the valve space and the first space; and the first pressure equalizing passage and the second pressure equalizing passage are formed separately.

* * * * *